(No Model.)
S. NEAL.
VEHICLE WHEEL.
No. 545,522. Patented Sept. 3, 1895.
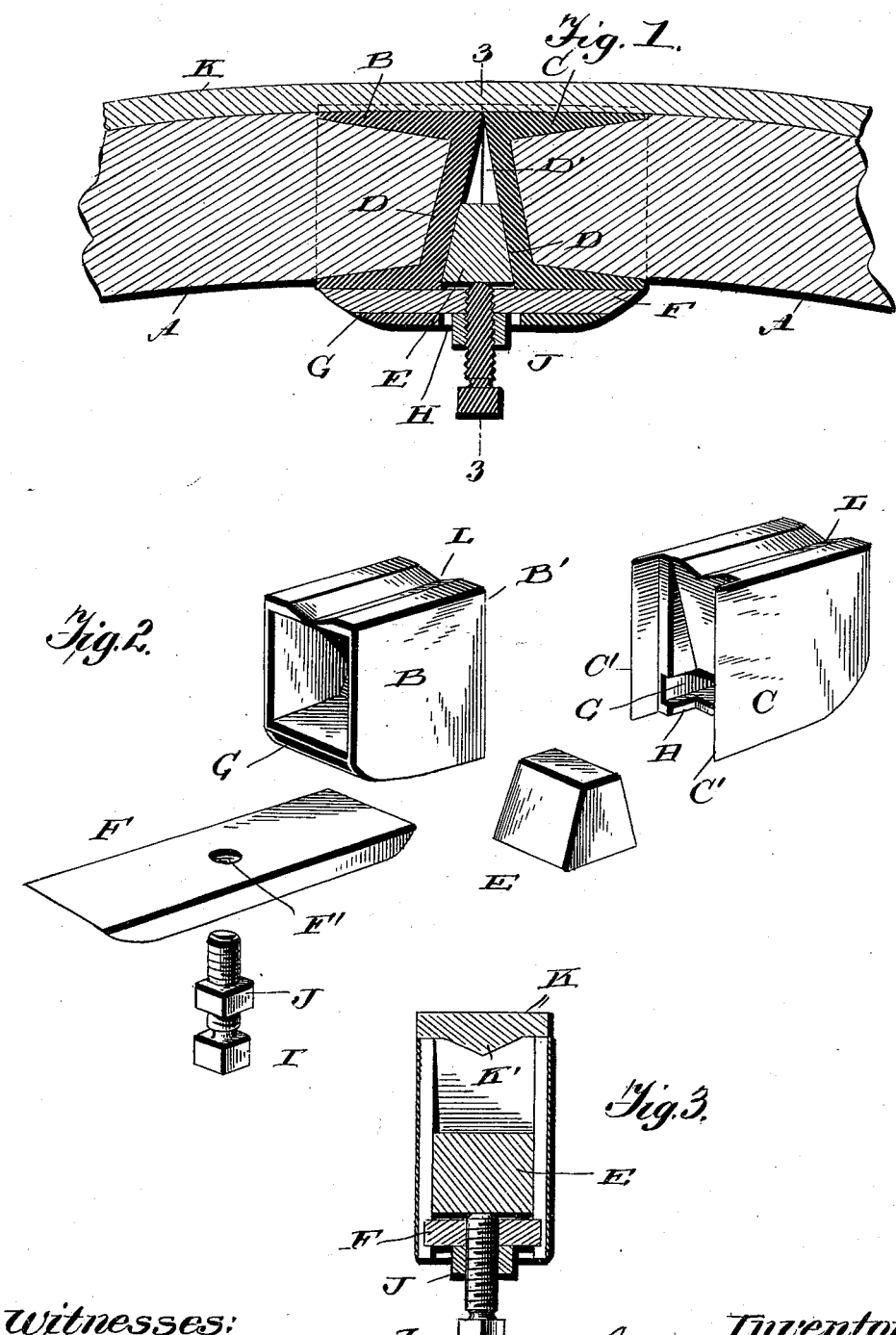
Witnesses:
L. C. Hills.
A. R. Hough.
Inventor:
Stephens Neal,
by Franklin H. Hough
Atty.

UNITED STATES PATENT OFFICE.

STEPHENS NEAL, OF TALBOTTON, GEORGIA.

VEHICLE-WHEEL.

SPECIFICATION forming part of Letters Patent No. 545,522, dated September 3, 1895.

Application filed July 2, 1895. Serial No. 554,741. (No model.)

*To all whom it may concern:*

Be it known that I, STEPHENS NEAL, a citizen of the United States, residing at Talbotton, in the county of Talbot and State of Georgia, have invented certain new and useful Improvements in Vehicle-Wheels; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in vehicle-wheels; and it has for its object, among others, the provision of a tire of peculiar construction and of means, substantially as hereinafter described, whereby the tire will be at all times held securely in place and insured against possible lateral displacement without the use of bolts, rivets, or screws being passed through the tire, as heretofore.

To this end and to such others as the invention may pertain the same consists in the novel construction of the tire and felly, and in combination therewith of my improved device for connecting the adjoining ends of the felly-sections, whereby the tire may at any time be readily tightened and will be securely locked against lateral displacement, all as hereinafter described, shown in the accompanying drawings, and then specifically defined in the appended claims.

The invention is clearly illustrated in the accompanying drawings, which, with the letters of reference marked thereon, form a part of this specification, like letters of reference indicating the same parts throughout the several views, in which—

Figure 1 is a vertical central section through a portion of the felly and tire of a vehicle, the same being taken through two adjoining ends of the felly-sections and showing the same secured in accordance with my invention. Fig. 2 is an enlarged detail in perspective showing the several parts of the tire-tightening mechanism, the said parts being shown as separated, but in their relative positions. Fig. 3 is a vertical section upon the line 3 3 of Fig. 1.

Reference now being had to the details of the drawings, A A designate the adjoining ends of two sections of the felly of a vehicle-wheel, having driven securely thereon the telescoping metalic castings B and C, respectively. The extreme ends of the side faces of the casting B are slightly tapered inwardly, as shown at B', to permit them to engage the inner faces of the correspondingly-tapered portions C' of the casting C to fit tightly over the same when the two parts of the casting are in place upon the wheel, thus preventing dust from entering the joint. The adjacent ends D D of the inner portion of the castings B and C are at the circumference of the rim of the wheel designed to be in contact, while at the inner edge of the felly the said ends are separated by a considerable distance, thus providing between the adjoining ends a triangular space, within which is seated a wedge-shaped metallic block E, which wedge-shaped block is adapted to be forced inwardly within the wedge-shaped recess D', thus forcing the adjacent ends of the felly-sections apart and tightening the tire of the wheel.

The castings B and C are each provided with a longitudinal opening G, which openings, when the castings are in position, as indicated in Fig. 1 of the drawings, register, and thus together form a continuous opening, within which is placed a metallic strip F, having at its longitudinal center a screw-threaded opening F' for the reception of the screw-threaded shank of the set-screw I, and a jam-nut J is provided upon the shank of the said set-screw I to prevent the said set-screw from working loose. An opening H is provided in the lower face of the two adjacent castings B and C, through which opening the wedge-shaped block E is inserted after the castings are in position and before the metallic strip F is inserted.

The under face of the tire K is provided with a longitudinal bead K', which engages a correspondingly-shaped recess L in the outer face of the castings B and C and a like recess extending entirely around the wheel, said recess being formed in the outer face of the felly.

From the foregoing description it will be readily seen that in uniting the parts the castings B and C are first securely driven over the ends of the felly-sections and the ends of the sections are placed in position. The tire is then placed upon the wheel, and the wedge-shaped block E is passed through the opening H into the wedge-shaped recess between the ends of the castings B and C. The metallic strip F is then seated in the opening G, said strip serving as a dowel to unite the castings. The set-screw I is inserted and forced inward against the larger end of the block E until the castings are forced apart sufficiently to securely set the tire in place upon the wheel. It will be at once seen that as long as the tire is held tightly in place upon the wheel the rib K' will, by reason of its engagement with the reecss L, be securely held against lateral displacement.

Having thus described my invention, what I claim to be new, and desire to secure by Letters Patent, is—

1. In combination with the two adjoining ends of a felly of the two part casting B and C adapted to be placed over the ends of the felly sections and when in place having a wedge shaped recess between the ends of the sections and the sides of the castings overlapping as described, a wedge shaped block E seated within the wedge shaped chamber between the ends, the metallic strip F serving as a dowel to unite the casting sections, and the set screw I for moving the block E, substantially as and for the purpose described.

2. In a tire tightener, the combination with the castings adapted to receive the adjacent ends of the felly sections the outer faces of said castings being provided with a continuous longitudinal groove, the wedge, its set screw, the jam nut upon the shank of the screw, and a tire having its under face provided with a rib to engage the slot in the faces of the castings, substantially as described.

In testimony whereof I affix my signature in presence of two witnesses.

STEPHENS NEAL.

Witnesses:
FRANKLIN H. HOUGH,
WILLIAM S. VAN LOAN.